US 6,550,788 B2

(12) United States Patent
Schmidt et al.

(10) Patent No.: US 6,550,788 B2
(45) Date of Patent: Apr. 22, 2003

(54) ELECTROMECHANICAL STABILIZER FOR A VEHICLE CHASSIS

(75) Inventors: Roland Schmidt, Stockdorf (DE); Albert Van der Knaap, Krimpen Aan Den Yssel (DE); Torsten Wey, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/936,329

(22) PCT Filed: Dec. 13, 2000

(86) PCT No.: PCT/EP00/13396
§ 371 (c)(1),
(2), (4) Date: Sep. 13, 2001

(87) PCT Pub. No.: WO01/51301

PCT Pub. Date: Jul. 19, 2001

(65) Prior Publication Data

US 2002/0180167 A1 Dec. 5, 2002

(30) Foreign Application Priority Data

Jan. 13, 2000 (DE) .......................................... 100 01 087

(51) Int. Cl.⁷ .......................................... B60G 21/055
(52) U.S. Cl. .............................. 280/5.511; 280/124.106; 267/188
(58) Field of Search ..................... 280/5.511, 5.506, 280/124.106, 124.107, 124.149, 124.152; 267/188, 273, 277

(56) References Cited

U.S. PATENT DOCUMENTS

| 5,186,486 | A | | 2/1993 | Hynds et al. | |
|---|---|---|---|---|---|
| 6,022,030 | A | * | 2/2000 | Fehring | 280/5.511 |
| 6,149,166 | A | * | 11/2000 | Struss et al. | 280/5.511 |
| 6,394,240 | B1 | * | 5/2002 | Barwick | 188/296 |
| 6,425,585 | B1 | * | 7/2002 | Schuelke et al. | 280/5.511 |
| 6,428,019 | B1 | * | 8/2002 | Kincad et al. | 280/5.511 |
| 6,435,531 | B1 | * | 8/2002 | Acker et al. | 280/124.107 |

FOREIGN PATENT DOCUMENTS

| DE | 197 14 565 | | 1/1998 |
|---|---|---|---|
| DE | 198 46 275 | | 12/1999 |
| DE | 19850169 | C1 * | 7/2000 |
| JP | 4-27615 | * | 1/1992 |

* cited by examiner

Primary Examiner—Paul N. Dickson
Assistant Examiner—David R. Dunn
(74) Attorney, Agent, or Firm—Crowell & Moring LLP

(57) ABSTRACT

An electromechanical stabilizer for the chassis of a vehicle, particularly a motor vehicle, is provided having an actuator which is integrated between two stabilizer halves and, as required, rotates the two stablizer halves with respect to one another by a rotation angle. The actuator consists of an electric motor as well as of a transmission connected to the output side of this electric motor. The transmission has a transmission ratio which changes as a function of the angle of rotation. The transmission is designed such that the smallest possible transmission ratio occurs in the neutral position while the stabilizer halves are not rotated with respect to one another. For large angles of rotation, this transmission ratio changes in the "infinite" direction. The transmission having a variable transmission ratio can be constructed for example, as a hypocycloidal transmission with linear guides or as an eccentric transmission.

10 Claims, 3 Drawing Sheets

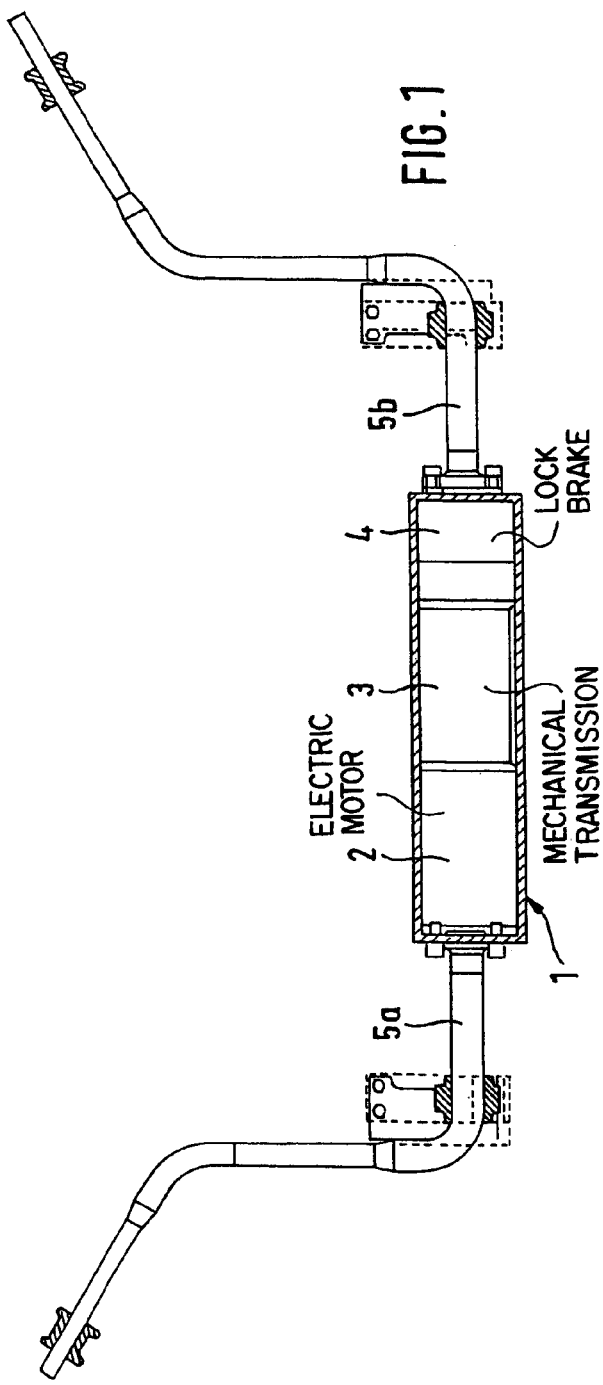
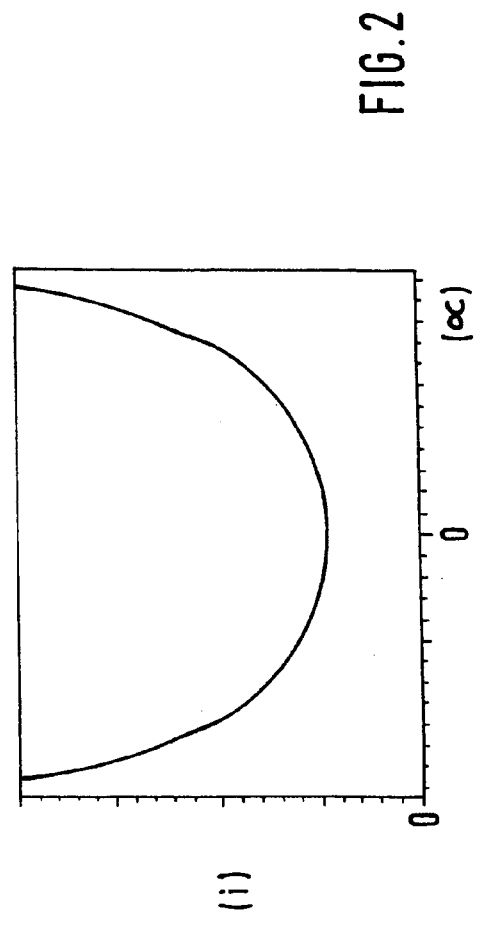

ELECTROMECHANICAL STABILIZER FOR A VEHICLE CHASSIS

BACKGROUND AND SUMMARY OF THE INVENTION

The invention relates to an electromechanical stabilizer for the chassis of a vehicle, particularly a motor vehicle, having an actuator, which is integrated between two stabilizer halves and, as required, rotates the latter with respect to one another by a rotation angle. The actuator consists of an electric motor, as well as a transmission connected to the output side of this electric motor. With respect to the technical environment, reference is made, for example, to German patent document DE 44 43 809 A1.

By means of a motor vehicle chassis whose stabilizer is divided into a first stabilizer half assigned to the suspension of the left wheel of a vehicle axle and into a second stabilizer half assigned to the suspension of the right wheel of this vehicle axle, and, in the case of which, these stabilizer halves can be rotated with respect to one another about their joint longitudinal axis, a clearly increased vehicle roll stability can be achieved in comparison to chassis having a one-piece stabilizer. In this case, a suitable oscillating motor or general actuator is provided between the two stabilizer halves which, on the basis of a suitable control, as required, rotates these stabilizer halves with respect to one another. This oscillating motor or actuator is constructed in the above mentioned patent document in the form of a hydraulic rotary drive.

Instead of a hydraulic rotary drive, an electromechanical actuator may be provided, which comprises an electric motor and a mechanical transmission as well as a locking brake. This results in a so-called electromechanical stabilizer consisting of the two stabilizer halves, which are connected with one another by an electromechanical actuator. As described above, this electromechanical actuator also has the purpose of achieving a rotation of the two stabilizer halves with respect to one another in a targeted manner, so that a desired stabilizer torque is generated which will then prevent a rolling of the vehicle body.

As illustrated in a simplified manner in FIG. 1, an electromechanical actuator internally known to the assignee of the present invention is marked with the reference number 1 and, as mentioned above, comprises an electric motor 2 and a mechanical transmission 3 as well as a locking brake 4. The selected transmission ratio of the transmission 3, which is preferably constructed as a three-stage planetary gear transmission, is constant. The dynamics of the overall system are decisively characterized by the transmission ratio, the inertia of the masses of the system and the resistance to torsion of the two stabilizer halves provided with the reference numbers 5a and 5b. The above-mentioned locking brake 4 is required for protecting the electric motor 2 against overload as a result of high stabilizer torques.

Electric motors are normally characterized by high rotational speeds and low nominal torques and are not particularly suitable per se for the present use in an electromechanical stabilizer. The reason for this is that the electromechanical actuator should generate high torques in this case while the angles of rotation are small. This contradiction necessarily results in a high transmission ratio for the required transmission, which, however, also has disadvantages. It therefore results not only in a large size (because of the required planetary stages) but also in a relatively low efficiency (because of the unavoidable friction losses). As a function of the respective usage, torques must be implemented on the stabilizer which are so high that the high transmission ratios required for this purpose cannot be implemented at all because the available space, as well as the efficiency, define an upper physical limit.

Furthermore, a high transmission ratio has a negative effect on the dynamics of the overall system. The reason is that the natural frequency of the system is inversely proportional to the transmission ratio. This is a result of the wheel-related inertia of the masses, which is defined from the actuator inertia multiplied by the squared wheel-related transmission ratio (this is the ratio between the angle of rotation of the electric motor and the resulting wheel lift). As a result, a negative influence is exercised on the driving comfort and the energy consumption of the overall system.

It is an object of the present invention to provide a remedial measure for these described problems. This object is achieved in that the transmission has a transmission ratio which changes as a function of the angle of rotation. Advantageous developments and further developments are described herein and contained in the subclaims.

BRIEF DESCRIPTION OF THE DRAWING

FIG. 1 is a simplified illustration of an electromechanical actuator;

FIG. 2 is a graph illustrating the course of the transmission ratio with respect to the angle of rotation;

DETAILED DESCRIPTION OF THE DRAWINGS

Figure 3:
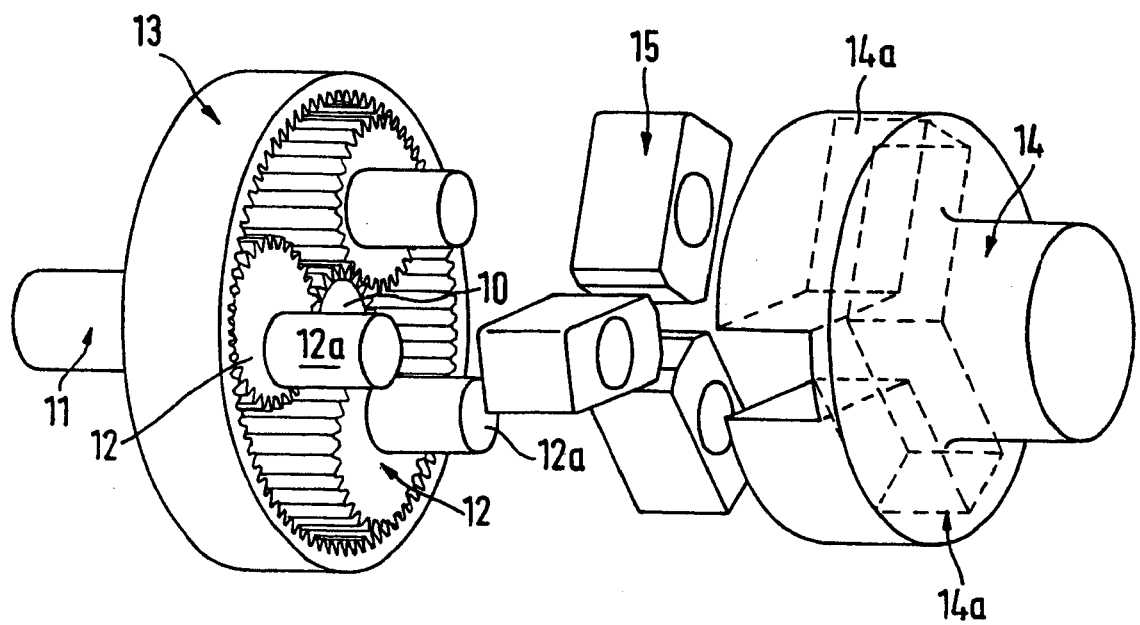
FIG. 3 is a perspective exploded view of a hypocycloidal transmission having linear guides in accordance with the present invention.

A continuously variable transmission is therefore contemplated which, as a function of the angle of rotation of the stabilizer halves or of the electric motor actuator, preferably continuously changes its ratio; that is, the mathematical linkage between the input angle of rotation of the transmission and its output angle of rotation corresponds to a non-linear static function. The layout of the transmission is preferably such that, for an input angle of 0°, a minimum of the transmission ratio is achieved and for large input angles, the ratio moves toward the infinite. As an example, the course of the transmission ratio relationship (dimensionless and indicated by the letter "i") is indicated in the attached FIG. 2 above the angle of rotation α (indicated in degrees of angle) in a diagram. As illustrated and adapted to the application case of a chassis stabilizer, starting from a center position, which corresponds to the input angle or angle of rotation α=0°, a positive as well as a negative angle of rotation can be adjusted between the two stabilizer halves with a corresponding rotating direction of the electric motor.

The curve indicated as an example in FIG. 2 for the transmission ratio i is of a variable transmission provided according to the invention. A total transmission ratio between the electric motor and the stabilizer halves, which differs from these values by a magnitude, can in this case be reached in combination with a constant preliminary transmission stage, that is, having a transmission with a constant ratio which is connected in series, if this is desirable or required.

A so-called variable transmission provided according to the invention with a transmission ratio which changes as a function of the angle of rotation can be implemented in various constructions; thus, for example, as a hypocycloidal transmission or as an eccentric transmission, but also in the form of a stabilizer with a laterally mounted crank, that is, in the form of a crank mechanism. For the power transmission, cranks or linear guides can generally be used, as also illustrated in the figures of preferred embodiments of the invention which will be described below.

However, first the considerable advantages offered by the variable transmission ratio at an electromechanical stabilizer in the areas of the construction size, the energy demand, the system dynamics, the functionality and the maximally possible stabilizer torque formation will be explained. Specifically, as initially indicated, a constant transmission ratio in an electromechanical actuator therefore would have to be relatively high in order to be able to generate an appropriately high stabilizer torque. Since the transmission ratio rises with the angle of rotation only when the suggested variable transmission ratio is used, almost arbitrarily large stabilizer torques can be generated with an increasing angle of rotation, which may definitely be desirable in extreme application cases. A suggested so-called variable transmission requires fewer preliminary stages for this purpose than does a conventional transmission with a constant transmission ratio. This obviously benefits the size of the overall arrangement, that is, less space will be required.

Furthermore, considerable advantages are obtained with respect to the energy demand of the entire system. For providing high torques between the two stabilizer halves, particularly by means of a relationship between the angle of rotation and the transmission ratio, the electric motor has to apply only a relatively low torque and therefore consumes little energy. When no particularly high torque is demanded between the stabilizer halves, thus, for example, when the vehicle drives straight ahead, only a low transmission ratio will be required in the variable transmission so that the mass related to the wheel of the chassis or the entire system is considerably reduced. Thus, advantageously, less energy has to be applied for reaching the comfort-related goals than when a high transmission ratio is present. In addition, keeping the number of stages as low as possible improves the overall efficiency of the transmission and thus the basic power consumption of the overall system.

In contrast, the dynamics of the overall system are advantageously clearly increased by the suggested variable ratio. The reason is that the natural frequency of the system is inversely proportional to the ratio, so that, especially in the center position, that is, when no particularly high torque is demanded either in the one or in the other direction, particularly the response behavior will be considerably improved. This clearly raises the comfort level when the vehicle is driving straight ahead. This comfort improvement is desirable because, in this operating condition, the vehicle occupants are particularly sensitive to characteristics of the chassis. By contrast, during cornering, a reduction of the dynamics takes place in favor of a loading of the electric motor because the transmission ratio of the variable transmission rises. This also corresponds to the desired design because, during cornering, a person reacts less sensitively to comfort characteristics than when the motor vehicle drives straight ahead.

With reference to the locking brake 4 in FIG. 1 (illustrating the assignee's internal state of the art), its functionality can be replaced partially or even completely by a variable transmission according to the invention. By increasing the vehicle roll angle over the range which can be compensated by the electromechanical stabilizer, the stabilizer torque is passively raised. No locking brake is required because of the variable transmission in order to prevent an undesirable continuing rotation of the actuator. In addition, as mentioned above, because of the transmission ratio curve illustrated in FIG. 2, clearly higher stabilizer torques can be implemented than by means of a constant transmission ratio.

In the following, the attached FIGS. 3 to 6 are only basic views of embodiments of a variable transmission according to the invention of an electromechanical actuator 1 or stabilizer with a transmission ratio which changes as a function of the angle of rotation. Here, the two stabilizer halves 5a, 5b as well as the electric motor 2 (compare FIG. 1) of the actuator 1 are usually not shown. Also, a series-connected transmission stage which can optionally be provided and was explained above and has a constant ratio (for achieving a desired total transmission ratio) is not shown.

FIG. 3 is a perspective exploded view of a hypocycloidal transmission with linear guides. As in a planetary gear, a sun wheel 10 is provided whose drive shaft 11 is connected with the electric motor (2) optionally by way of another transmission stage with a constant ratio. As illustrated, the planet wheels 12 have eccentrically arranged bolts 12a and are guided by the ring gear 13, which is non-rotatably connected with one of the two stabilizer halves (5a or 5b).

The output element 14 of this hypocycloidal transmission is non-rotatably connected with the other stabilizer half (5b or 5a), in which just as many sliding block guides 14a as planet wheels 12 are present. In each sliding block guide 14a, a sliding block 15 is disposed which has a receiving device for a bolt 12a of the assigned planet wheel 12.

Figure 6:
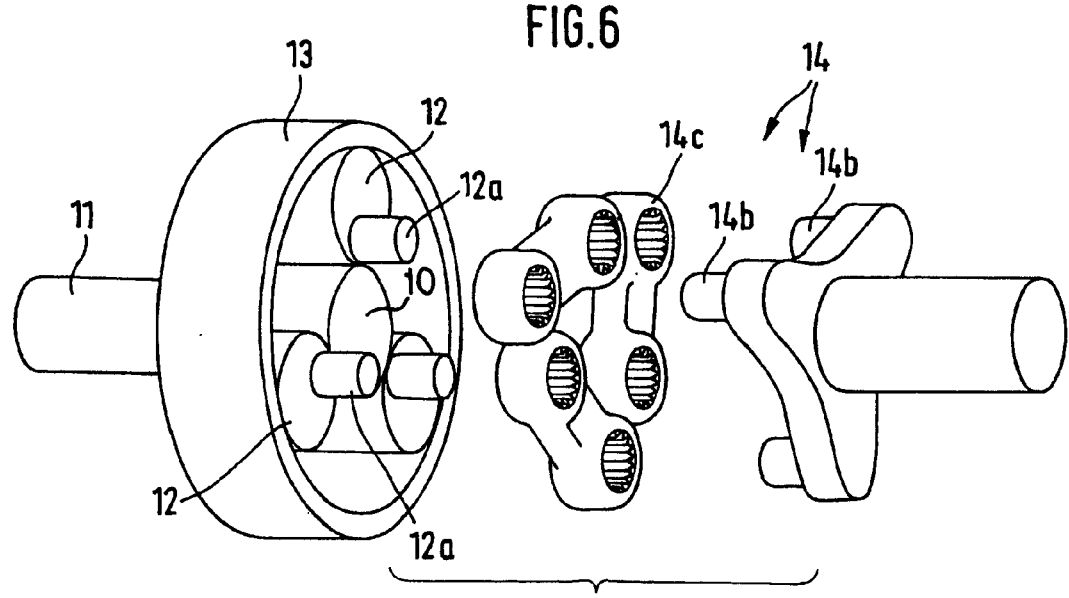
FIG. 6 is a perspective exploded view, simplified with respect to that of FIG. 3, with a hypocycloidal transmission having a crank according to the present invention.

FIG. 6 is a perspective exploded view, which is simplified with respect to FIG. 3, of a hypocycloidal transmission with a crank. Here also, the sun wheel 10 is connected by means of its drive shaft 11 with the electric motor (2), while the ring gear 13 is non-rotatably connected with one of the two stabilizer halves (5a or 5b). The output element 14 of this hypocycloidal transmission is non-rotatably connected with the other stabilizer half (5b or 5a) and is provided with crank pins 14b, which carry three connecting rods 14c which, in turn, have receiving devices for the above-mentioned eccentric bolts 12a of the planet wheels 12.

Figure 4:
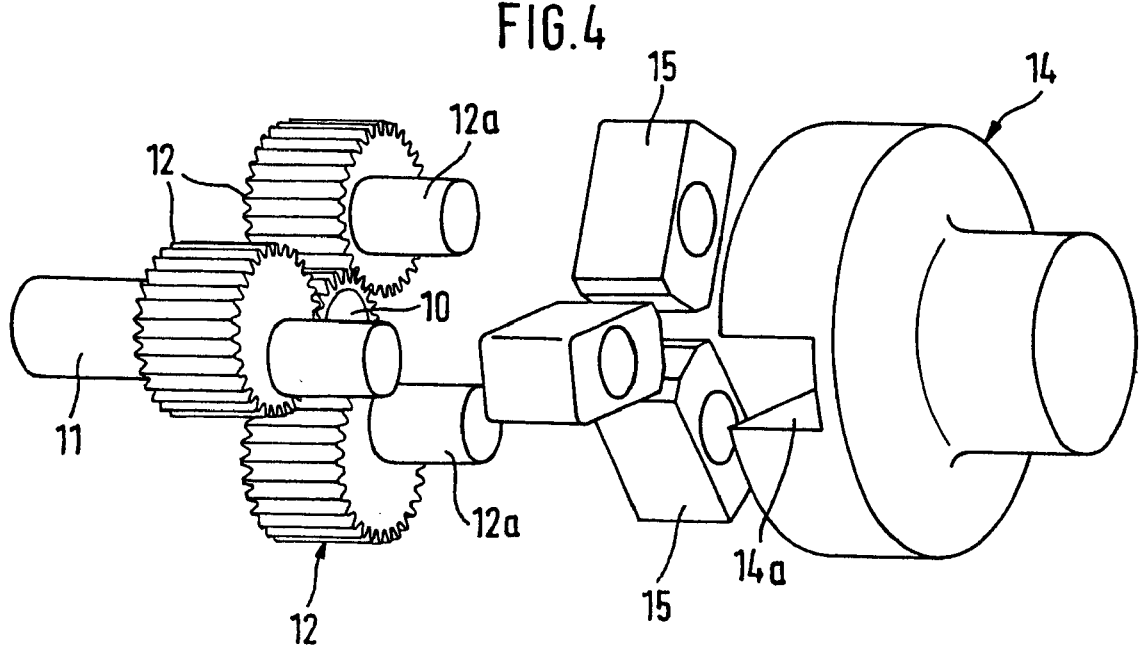
FIG. 4 is a perspective exploded view of an eccentric transmission having linear guides according to the present invention.

FIG. 4 is a perspective exploded view of an eccentric transmission with linear guides. As in a planetary gear, a sun wheel 10 is also provided here, whose drive shaft 11 is connected with the electric motor (2) optionally by way of another transmission stage with a constant ratio. As illustrated, the planet wheels 12 again have eccentrically arranged bolts 12a, in which case the axes of rotation of the planet wheels, in a manner which is not shown here for reasons of simplicity, are combined to a (not shown) shaft journal which is non-rotatably connected with one of the two stabilizer halves (5a or 5b). The output side of this transmission has a design analogous to FIG. 3; that is, the output element 14 of this eccentric transmission is non-rotatably connected with the other stabilizer half (5b or 5a), in which case just as many sliding block guides 14a are provided in this output element 14 as planet wheels 12 are present. In each sliding block guide 14a, a sliding block 15 is disposed which has a receiving device for a bolt 12a of the assigned planet wheel 12.

Figure 5:
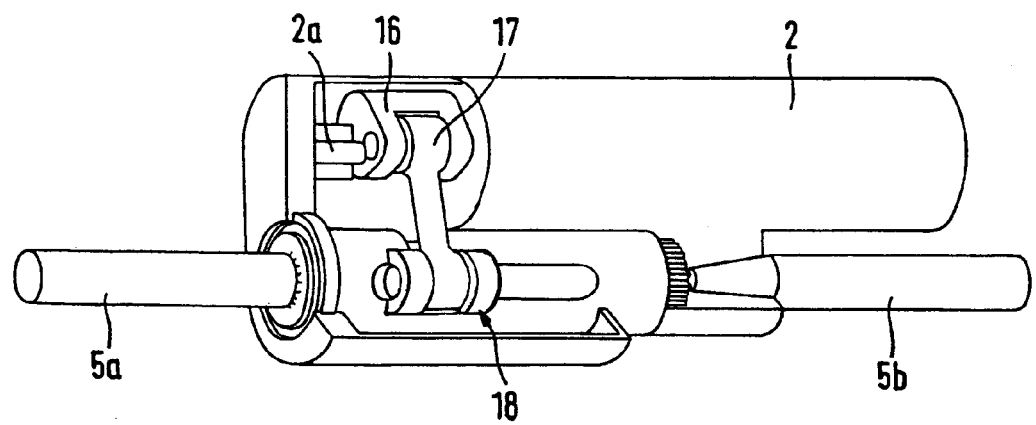
FIG. 5 illustrates a crank gear according to the present invention.

FIG. 5 shows a crank gear which consists of a crank 16, a connecting rod 17 linked to the latter as well as a rocker 18, which is linked to the connecting rod 17 in an articulated manner and is cylindrical in this case. The rocker 18 is non-rotatably connected with the stabilizer half 5a which is on the left here, while the stabilizer half 5b (which is on the right here) is non-rotatably connected to the housing of the electric motor 2. Its axis of rotation 2a is non-rotatably connected with the crank 16 so that, during a rotating movement of the axis of rotation 2a of the electric motor, the two stabilizer halves 5a, 5b are rotated with respect to one another in a desirable manner at a transmission ratio (i) which changes as a function of the angle of rotation ($\alpha$; compare FIG. 2).

The transmissions, which are shown and explained here as examples, have different dependencies between the angle of rotation and the respective actual transmission ratio. Depending on the practical application, a respectively suitable transmission can be selected while taking into account other marginal conditions (such as construction expenditures, durability, etc.). Naturally, additional transmission embodiments can be used which will not be explained here. A large number of details, particularly of the constructive type, may also constructively deviate from the embodiment shown here, without departing from the scope and content of the claims. It is always important that a transmission is used for the claimed application case which has a transmission ratio which changes as a function of the angle of rotation.

What is claimed is:

1. An electromechanical stabilizer for a chassis of a motor vehicle, comprising:

first and second stabilizer halves;

an actuator integrated between the first and second stabilizer halves, said actuator rotating the first and second stabilizer halves with respect to one another by a rotation angle as required;

wherein said actuator comprises an electric motor having an output side and a transmission coupled to the output side of the electric motor, said transmission having a variable transmission ratio which changes as a function of the rotation angle.

2. The electromechanical stabilizer according to claim 1, wherein said transmission is designed such that a smallest possible transmission ratio occurs in a neutral position in which the first and second stabilizer halves are not rotated with respect to one another, and further wherein the transmission ratio changes toward an infinite direction for large angles of rotation.

3. The electromechanical stabilizer according to claim 2, further comprising a transmission stage having a constant transmission ratio, said constant ratio transmission stage being connected in series with the transmission having a variable transmission ratio.

4. The electromechanical stabilizer according to claim 2, wherein the transmission having the variable transmission ratio is one of a: hypocycloidal transmission with linear guides, a crank transmission, and an eccentric transmission.

5. The electromechanical stabilizer according to claim 2, wherein the transmission having the variable transmission ratio is a crank gear.

6. The electromechanical stabilizer according to claim 1, further comprising a transmission stage having a constant transmission ratio, said constant ratio transmission stage being connected in series with the transmission having a variable transmission ratio.

7. The electromechanical stabilizer according to claim 6, wherein the transmission having the variable transmission ratio is one of a: hypocycloidal transmission with linear guides, a crank transmission, and an eccentric transmission.

8. The electromechanical stabilizer according to claim 6, wherein the transmission having the variable transmission ratio is a crank gear.

9. The electromechanical stabilizer according to claim 1, wherein the transmission having the variable transmission ratio is one of a: hypocycloidal transmission with linear guides, a crank transmission, and an eccentric transmission.

10. The electromechanical stabilizer according to claim 1, wherein the transmission having the variable transmission ratio is a crank gear.

* * * * *